(12) United States Patent
Lu et al.

(10) Patent No.: US 8,661,342 B2
(45) Date of Patent: Feb. 25, 2014

(54) MAIL MERGE INTEGRATION TECHNIQUES

(75) Inventors: Michael J. Lu, Seattle, WA (US); Edward A. Martinez, Redmond, WA (US); Shashi Ranjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 12/140,292

(22) Filed: Jun. 17, 2008

(65) Prior Publication Data

US 2009/0313209 A1  Dec. 17, 2009

(51) Int. Cl.
*G06F 17/00* (2006.01)
*G06F 21/00* (2013.01)

(52) U.S. Cl.
USPC ........... 715/271; 715/234; 715/235; 715/236; 709/206

(58) Field of Classification Search
USPC ................. 715/234, 271, 235, 236; 709/206
See application file for complete search history.

(56) References Cited

U.S. PATENT DOCUMENTS

| | | | |
|---|---|---|---|
| 5,862,325 A * | 1/1999 | Reed et al. | 709/201 |
| 6,088,717 A * | 7/2000 | Reed et al. | 709/201 |
| 6,330,073 B1 | 12/2001 | Sciatto | |
| 6,732,152 B2 | 5/2004 | Lockhart et al. | |
| 6,763,500 B2 | 7/2004 | Black et al. | |
| 7,181,734 B2 * | 2/2007 | Swamy et al. | 717/144 |
| 7,555,707 B1 * | 6/2009 | Labarge et al. | 715/234 |
| 7,725,816 B2 * | 5/2010 | Cottrille et al. | 715/234 |
| 7,870,485 B2 * | 1/2011 | Seliutin et al. | 715/271 |
| 2002/0103826 A1 | 8/2002 | Kriho et al. | |
| 2004/0015837 A1 | 1/2004 | Worthington et al. | |
| 2004/0153465 A1 | 8/2004 | Singleton et al. | |
| 2005/0039119 A1 * | 2/2005 | Parks et al. | 715/515 |
| 2005/0094205 A1 * | 5/2005 | Lo et al. | 358/1.18 |
| 2005/0094206 A1 * | 5/2005 | Tonisson | 358/1.18 |
| 2005/0094207 A1 * | 5/2005 | Lo et al. | 358/1.18 |
| 2005/0125781 A1 * | 6/2005 | Swamy et al. | 717/144 |
| 2005/0181864 A1 * | 8/2005 | Britt et al. | 463/25 |
| 2006/0031225 A1 * | 2/2006 | Palmeri et al. | 707/10 |
| 2006/0064313 A1 * | 3/2006 | Steinbarth et al. | 705/1 |
| 2006/0075323 A1 | 4/2006 | Singh et al. | |

(Continued)

OTHER PUBLICATIONS

Microsoft® Office Word 2007 on Demand by Steve Johnson, Que Feb. 13, 2007.*

(Continued)

*Primary Examiner* — William Bashore
*Assistant Examiner* — Nathan Shrewsbury
(74) *Attorney, Agent, or Firm* — Damon Rieth; Brian Haslam; Micky Minhas

(57) ABSTRACT

Various technologies and techniques are disclosed for integrating a customer relationship management application with a mail merge operation on a client-side word processor. Mail merge settings are received from a user, including a record set to use in a mail merge operation. A new mail merge document is created. The record set is added to the mail merge document. A link is added to a template that will control the mail merge operation on a client-side word processor. The linked template gets attached to the new mail merge document when opened on the client-side word processor. Techniques for beginning a mail merge operation on a client-side word processor are described. A downloaded mail merge document is validated. The record set contained in the downloaded mail merge document is separated into one or more separate files. A mail merge wizard is started and advanced to a proper stage.

19 Claims, 18 Drawing Sheets

(56) References Cited

U.S. PATENT DOCUMENTS

| | | | | |
|---|---|---|---|---|
| 2007/0005635 A1* | 1/2007 | Martinez et al. | | 707/102 |
| 2007/0038717 A1* | 2/2007 | Burkholder et al. | | 709/206 |
| 2007/0078697 A1* | 4/2007 | Nixon | | 705/9 |
| 2008/0028293 A1* | 1/2008 | Seliutin et al. | | 715/234 |
| 2008/0065981 A1* | 3/2008 | Voslow | | 715/234 |
| 2008/0147813 A1* | 6/2008 | Damm et al. | | 709/206 |
| 2008/0147814 A1* | 6/2008 | Damm et al. | | 709/206 |
| 2008/0147815 A1* | 6/2008 | Damm et al. | | 709/206 |
| 2008/0276218 A1* | 11/2008 | Taylor et al. | | 717/106 |
| 2009/0146410 A1* | 6/2009 | Uslontsev et al. | | 283/81 |
| 2009/0177739 A1* | 7/2009 | Uslontsev et al. | | 709/203 |
| 2009/0234694 A1* | 9/2009 | Uslontsev et al. | | 705/7 |
| 2009/0254572 A1* | 10/2009 | Redlich et al. | | 707/10 |

OTHER PUBLICATIONS

Working with Microsoft Dynamics™ CRM 3.0 by: Mike Snyder; Microsoft Press Mar. 15, 2006.*

Microsoft® Office Word 2007 on Demand by Steve Johnson, Que Feb. 13, 2007 (p. 292).*

Microsoft® Office Word 2007 on Demand by Steve Johnson, Que Feb. 13, 2007 (Word) pp. 247.*

"Microsoft Dynamics CRM 4.0 Mail Merge", Retrieved at <<http://www.milesconsultingcorp.com/Mail-Merge-Feature-Microsoft-CRM.aspx>>, Retrieved Date: Feb. 13, 2008, pp. 3.

"Vtiger Office Plugin 5.0.3—User Manual", Retrieved at <<http://wiki.vtiger.com/index.php/Vtiger_Office_Plugin_5.0.3_-_User_Manual>>, Retrieved Date: Feb. 13, 2008, pp. 6.

"4TOPS Mail Merge for MS Access XP/03 v5.0", Retrieved at <<http://www.fileheap.com/software-4tops-mail-merge-for-ms-access-xp-03-download-3715.html>>, Retrieved Date: Feb. 13, 2008, pp. 3.

"XML2Word 1.0", Retrieved at <<http://www.download.com/XML2Word/3000-2401_4-10049995.html>>, Retrieved Date: Feb. 13, 2008, p. 1.

* cited by examiner

| ADDING COLUMNS [LIGHTCLIENT] -- WEBPAGE DIALOG | | | – 🗗 X |
|---|---|---|---|
| ADD COLUMNS | | | |
| SELECT THE COLUMNS TO ADD TO THIS VIEW. | | | |
| RECORD TYPE | ACCOUNT | | ▶ |
| DISPLAY NAME | NAME | | TYPE |
| ☑ ACCOUNT NAME | NAME | | TEXT |
| ☑ ACCOUNT NUMBER | ACCOUNTNUMBER | | TEXT |
| ☐ ACCOUNT RATING | AACCOUNTRATINGCODE | | PICKLIST |
| ☐ ADDRESS 1: ADDRESS TYPE | ADDRESS 1_ADDRESSTYPECODE | | PICKLIST |
| ☑ ADDRESS 1: CITY | ADDRESS1_CITY | | TEXT |
| ☑ ADDRESS 1: COUNTR/REGION | ADDRESS1_COUNTRY | | TEXT |
| ☐ ADDRESS 1: COUNTY | ADDRESS1_COUNTY | | TEXT |
| ☐ ADDRESS 1: FAX | ADDRESS1_FAX | | TEXT |
| ☐ ADDRESS 1: FREIGHT TERMS | ADDRESS1_FREIGHTTERMSCODE | | PICKLIST |
| ☐ ADDRESS 1: LATITUDE | ADDRESS1_LATITUDE | | FLOAT |
| ☐ ADDRESS 1: LONGITUDE | ADDRESS1_LONGITUDE | | FLOAT |
| ☐ ADDRESS 1: NAME | ADDRESS1_NAME | | TEXT |
| ☐ ADDRESS 1: POST OFFICE BOX | ADDRESS1_POSTOFFICEBOX | | TEXT |
| ☐ ADDRESS 1: PRIMARY CONTACT NAME | ADDRESS1_PRIMARYCONTACTNAME | | TEXT |
| NUMBER OF SELECTED DATA FIELDS: 29 (MAX 62) | | OK | CANCEL |

MAIL MERGE TEMPLATE — 472    − ⊡ X

| SAVE AND CLOSE | CREATE TEMPLATE IN WORD PROCESSOR | ACTIONS ▶ |

! There is no document attached. This record cannot be used for mail merge unless it has a document saved as an XML file.

GENERAL DETAILS

NAME* [My Mail Merge Template] — 474

DESCRIPTION [This is my personal template.] — 476

CATEGORIZATION

ASSOCIATED ENTITY* [Account ▶]

OWNERSHIP

[Individual ▶]    Owner* [First name Last name ▶]

LANGUAGE

TEMPLATE LANGUAGE [English]

SELECT DATA FIELDS

[DATA FIELDS] — 478    Selected Fields: Default

FILE ATTACHMENT

[_____ Browse... ] [Attach]

FILE NAME:

Status: Active

| MAIL MERGE TEMPLATE | | – ⊡ X |
|---|---|---|
| SAVE AND CLOSE | EDIT TEMPLATE IN WORD PROCESSOR — 482 | ACTIONS ▶ |

GENERAL DETAILS
NAME* [My Mail Merge Template]
DESCRIPTION [This is my personal template.]

CATEGORIZATION
ASSOCIATED ENTITY* [Account ▶]
OWNERSHIP* [Individual ▶] Owner* [First name Last name ▶]

LANGUAGE
TEMPLATE LANGUAGE [English]

SELECT DATA FIELDS
[DATA FIELDS]   SELECTED FIELDS: 31 — 488

FILE ATTACHMENT
FILE NAME: [THIS IS THE TABLE TEMPLATE FOR 2007.XML  (33,138 BYTE(S))  490]   [Remove]

Status: Active

FIG. 15

| ADDING COLUMNS [LIGHTCLIENT] -- WEBPAGE DIALOG | | – ⧉ X |
|---|---|---|
| ADD COLUMNS | | |
| SELECT THE COLUMNS TO ADD TO THIS VIEW. | | |

| RECORD TYPE | ACCOUNT | ▶ |
|---|---|---|

| DISPLAY NAME | NAME | TYPE |
|---|---|---|
| ☑ ACCOUNT NAME | NAME | TEXT |
| ☑ ACCOUNT NUMBER | ACCOUNTNUMBER | TEXT |
| ☐ ACCOUNT RATING | AACCOUNTRATINGCODE | PICKLIST |
| ☐ ADDRESS 1: ADDRESS TYPE | ADDRESS 1_ADDRESSTYPECODE | PICKLIST |
| ☑ ADDRESS 1: CITY | ADDRESS1_CITY | TEXT |
| ☑ ADDRESS 1: COUNTR/REGION | ADDRESS1_COUNTRY | TEXT |
| ☐ ADDRESS 1: COUNTY | ADDRESS1_COUNTY | TEXT |
| ☐ ADDRESS 1: FAX | ADDRESS1_FAX | TEXT |
| ☐ ADDRESS 1: FREIGHT TERMS | ADDRESS1_FREIGHTTERMSCODE | PICKLIST |
| ☐ ADDRESS 1: LATITUDE | ADDRESS1_LATITUDE | FLOAT |
| ☐ ADDRESS 1: LONGITUDE | ADDRESS1_LONGITUDE | FLOAT |
| ☐ ADDRESS 1: NAME | ADDRESS1_NAME | TEXT |
| ☐ ADDRESS 1: POST OFFICE BOX | ADDRESS1_POSTOFFICEBOX | TEXT |
| ☐ ADDRESS 1: PRIMARY CONTACT NAME | ADDRESS1_PRIMARYCONTACTNAME | TEXT |

NUMBER OF SELECTED DATA FIELDS: 29 (MAX 62)

[ OK ]  [ CANCEL ]

| MAIL MERGE TEMPLATE | | – ⊡ X |
|---|---|---|
| SAVE AND CLOSE | CREATE TEMPLATE IN WORD PROCESSOR | ACTIONS ▶ |

498 ↗          499 ↗

Under ACTIONS:
- DELETE MAIL MERGE TEMPLATE
- DEACTIVATE MAIL MERGE TEMPLATE
- MAKE AVAILABLE TO ORGANIZATION
- ASSIGN...
- SHARING...
- COPY SHORTCUT
- SEND SHORTCUT...

! There is no document attached. This record cannot be used for mail merge unless saved as an XML file.

GENERAL
DETAILS
NAME*  [Test 1]

DESCRIPTION  [Test 1]

CATEGORIZATION
ASSOCIATED ENTITY*  [Account ▶]

OWNERSHIP*  [Individual ▶]   Owner*  [First name Last name]

LANGUAGE
TEMPLATE LANGUAGE  [English]

SELECT DATA FIELDS
[DATA FIELDS]    Selected Fields: Default

FILE ATTACHMENT
[_____]  [Browse....]  [Attach]

FILE NAME:
Status: Active

MAIL MERGE INTEGRATION TECHNIQUES

BACKGROUND

Mail merge is a feature that allows a user to customize a document and send that document to a group of people without having to type a separate letter for each person. A mail merge process typically uses an external data source on which the template document operates to dynamically produce these personalized documents.

Many customer relationship management (CRM) systems of today are Internet-based so sales people can easily access the data remotely. However, the technologies that enable mail merge to be performed are typically found on a client-side application such as MICROSOFT® Office Word. Difficulties can arise when trying to utilize mail merge features in a client-side application with data contained in an Internet-based CRM application without having to install additional programs.

SUMMARY

Various technologies and techniques are disclosed for integrating a customer relationship management application with a mail merge operation on a client-side word processor. Mail merge settings are received from a user, including a record set to use in a mail merge operation. A new mail merge document is created. The record set is added to the mail merge document. A link is added to a template that will control the mail merge operation on a client-side word processor. The linked template gets attached to the new mail merge document when opened on the client-side word processor.

In one implementation, a method for beginning a mail merge operation on a client-side word processor is described. A downloaded mail merge document is validated. The record set contained in the downloaded mail merge document is separated into one or more separate files. A mail merge wizard is started and advanced to a later stage based upon settings already specified by the user.

In one implementation, techniques for uploading and managing mail merge templates that were created in a word processor into a customer relationship management application are described. A selection is received from a user to upload a mail merge template for a word processor to a customer relationship management application. The user is prompted to specify additional template settings that are used by the customer relationship management application to help integrate a mail merge operation initiated in the customer relationship management application with the word processor. The mail merge template and additional template settings are stored in the customer relationship management application for later use.

In another implementation, a customer relationship management application that has integrated mail merge functionality is described. A request is received from a user to perform a mail merge operation from within a customer relationship management application. The user is prompted to specify mail merge settings to be used in the mail merge operation. A mail merge document is created that contains a record set to be used in the mail merge operation along with a link to a template that contains a macro for controlling the mail merge operation when opened within a client-side word processor.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a simulated screen for one implementation that illustrates the user selecting fields to include in the mail merge operation from within a CRM application.

FIG. 14 is a simulated screen for one implementation that illustrates allowing a user to manage a mail merge template from within a CRM application.

FIG. 15 is a simulated screen for one implementation that illustrates a mail merge template within a CRM application.

FIG. 16 is a simulated screen for one implementation that illustrates the customization of a mail merge template to select fields to include from within a CRM application.

FIG. 17 is a simulated screen for one implementation that illustrates the assignment of sharing and other security settings for a mail merge template from within a CRM application.

DETAILED DESCRIPTION

Figure 1:
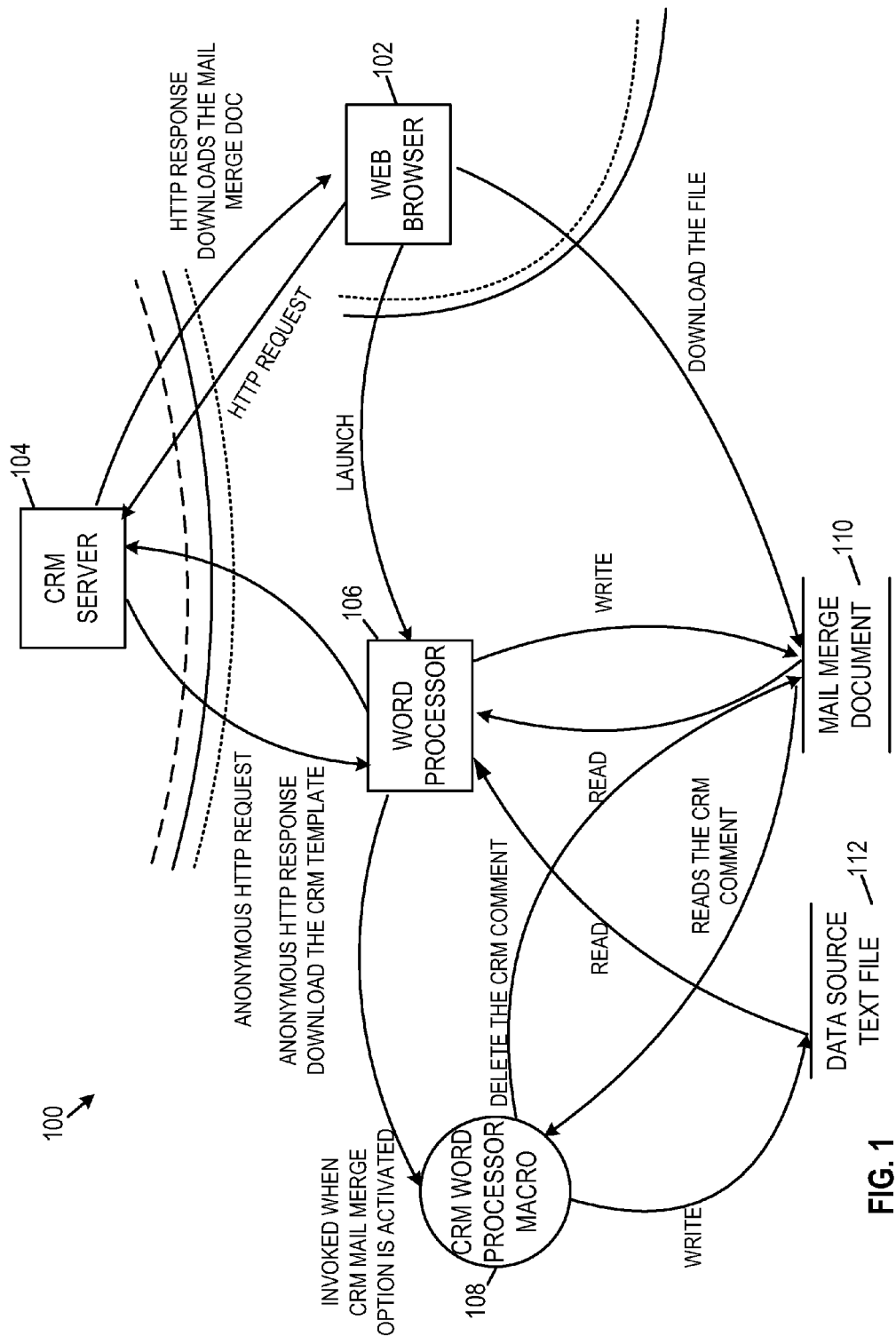
FIG. 1 is a diagrammatic view of a mail merge system of one implementation.

The technologies and techniques herein may be described in the general context as techniques for integrating mail merge on a client-side application with an Internet-based application, but the technologies and techniques also serve other purposes in addition to these. In one implementation, one or more of the techniques described herein can be implemented as features within a word processing program such as MICROSOFT® Office Word, from a customer relationship management system such as MICROSOFT® Dynamics, or from any other type of program or service that provides mail merge functionality.

As mentioned in the Background Section, it can be difficult to utilize mail merge features on a client-side application when the data needed for the mail merge is stored in an Internet-based application such as a customer relationship management (CRM) system. One existing technique that is sometimes utilized for combining the two include the creation of a smart client that knows how to pull down the data source in the correct format and then hook it up to the client side application running mail merge. One problem with this approach is that it requires installation of a client-side application or plug-in in order for the interaction between the client-side application and the Internet-based application to work correctly.

Another technique that is sometimes used is to mimic the mail merge behavior on the server (such as directly within the CRM or other Internet-based application). In such a scenario, the user inputs are entered, templates are created, and final documents that can be printed or emailed out are created, all from within the Internet-based application. One problem with this approach is that the mail merge functionality is limited in comparison to what the user can achieve with the client-side mail merge process available through the word processor program on the user's desktop.

In one implementation, mail merge techniques are described that integrates a CRM application and a mail merge operation on a client-side word processor into one user experience via the use of an attached template containing macros, such as signed macros that have a digital signature identifying their source. The terms "customer relationship management application" and "CRM application" as used herein are meant to include any type of Internet-based application that stores relationship data such as name, address, and/or phone number of customers, prospects, and/or vendors. The term "client-side word processor" as used herein is meant to include a program installed locally on a user's computer that has a mail merge feature.

The mail merge techniques described herein can be utilized without having to install a plug-in or application on the client-application (beyond the existing word processor itself), and the existing word processing mail merge process is integrated and enhanced. Data for the mail merge (such as the mail merge template, data source and other user selections) is pulled from the CRM application as one single document to the client-side application. The document contains a link to the CRM template present on the CRM server.

When the document is opened inside a word processor such as MICROSOFT® Office Word, the linked CRM template is downloaded and attached to the current document. The linked template also contains a signed macro. When the signed macro is invoked (such as upon user selection or automatically), the individual components of the document are disassembled and the document is prepared for running the mail merge operation on the client-side application to dynamically generate documents for distribution.

FIG. 1 shows a high level view of one implementation of a mail merge system 100. The user can utilize a web browser 102, such as MICROSOFT® Internet Explorer or Firefox, to log on to a CRM server 104 and view the data. The user can invoke the mail merge process by selecting a mail merge option, such as by clicking on a mail merge icon; the user then makes the selection to the options given. A mail merge document 110 (such as an XML file) is then generated based upon the user selections, and is then downloaded automatically or upon user selection. The mail merge document 110 contains the record set for the mail merge and other mail merge settings. The term "mail merge document" as used herein is referring to the document generated by the customer relationship management system that contains the record set and other mail merge settings that will then be used in the word processor. This mail merge document 110, when opened in the word processor 106, causes the word processor 106 to download a CRM template from the server 104 and install the CRM macro 108. The term "CRM template" as used herein is referring to a template file that contains a macro that is used to integrate a customer relationship management application with a mail merge operation in a word processor. In another implementation, CRM macro 108 can also be part of the downloaded document 110.

In one implementation, the CRM macro 108 is invoked when user clicks a CRM option from within the word processor. The CRM option becomes available once the CRM template is attached to the document. In another implementation, the CRM macro 108 is invoked automatically when the mail merge document 110 is opened in the word processor. In either scenario, the CRM macro 108 is responsible for operating on the current document to prepare the current document for running mail merge inside of the word processor 106. Such preparation can include extracting the record set from the mail merge document and putting the record set into a separate file 112.

In one implementation, the CRM template that is located on the CRM server is available for anonymous access so the user does not have to re-authenticate or maintain any authentication status after download of the mail merge document. The mail merge system 100 will be described in further detail in FIGS. 2-18.

Turning now to FIGS. 2-17, the stages for implementing one or more implementations of mail merge system 100 are described in further detail. In some implementations, the processes of FIG. 2-17 are at least partially implemented in the operating logic of computing device 500 (of FIG. 18).

Figure 2:
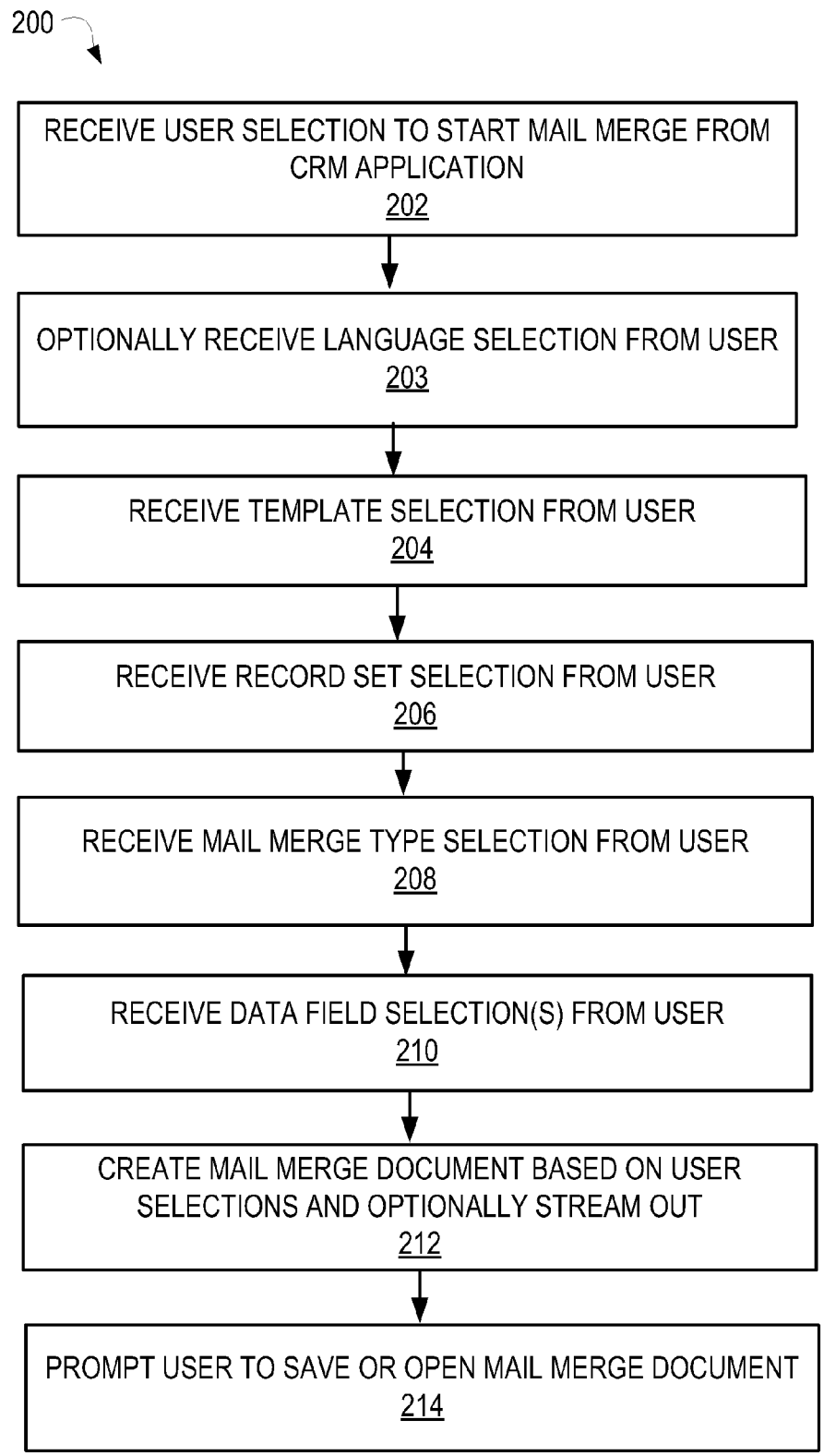
FIG. 2 is a process flow diagram for one implementation illustrating the stages involved in receiving user selections for a mail merge operation.

FIG. 2 is a process flow diagram 200 for one implementation illustrating the stages involved in receiving user selections for a mail merge operation. A selection is received from a user to start a mail merge operation from a CRM application (stage 202). A language selection is optionally received from the user (stage 203), such as to specify the language (e.g. English, Spanish, etc.) to be used for creating the contents of the template. A template selection is received from the user (stage 204) to indicate which pre-defined template that contains the body of the document should be used. A record set selection is received from the user (stage 206) to indicate which records (i.e. customers and/or vendors) should be included in the mail merge. A mail merge type selection is received from the user (stage 208), such as to indicate that the mail merge will be a letter, an envelope, etc. Data field selections are received from the user (stage 210) to specify which fields should be included for each record (such as name, address, etc.). These user specified settings are described in further detail in FIG. 3-6. A mail merge document is then created based upon the user selections (stage 212), as described in further detail in FIG. 7. The generated mail merge document is streamed out for download in response to the user selections—(stage 212). The web browser, after downloading the streamed out file prompts the user to save or open the mail merge document (stage 214).

Figure 3:
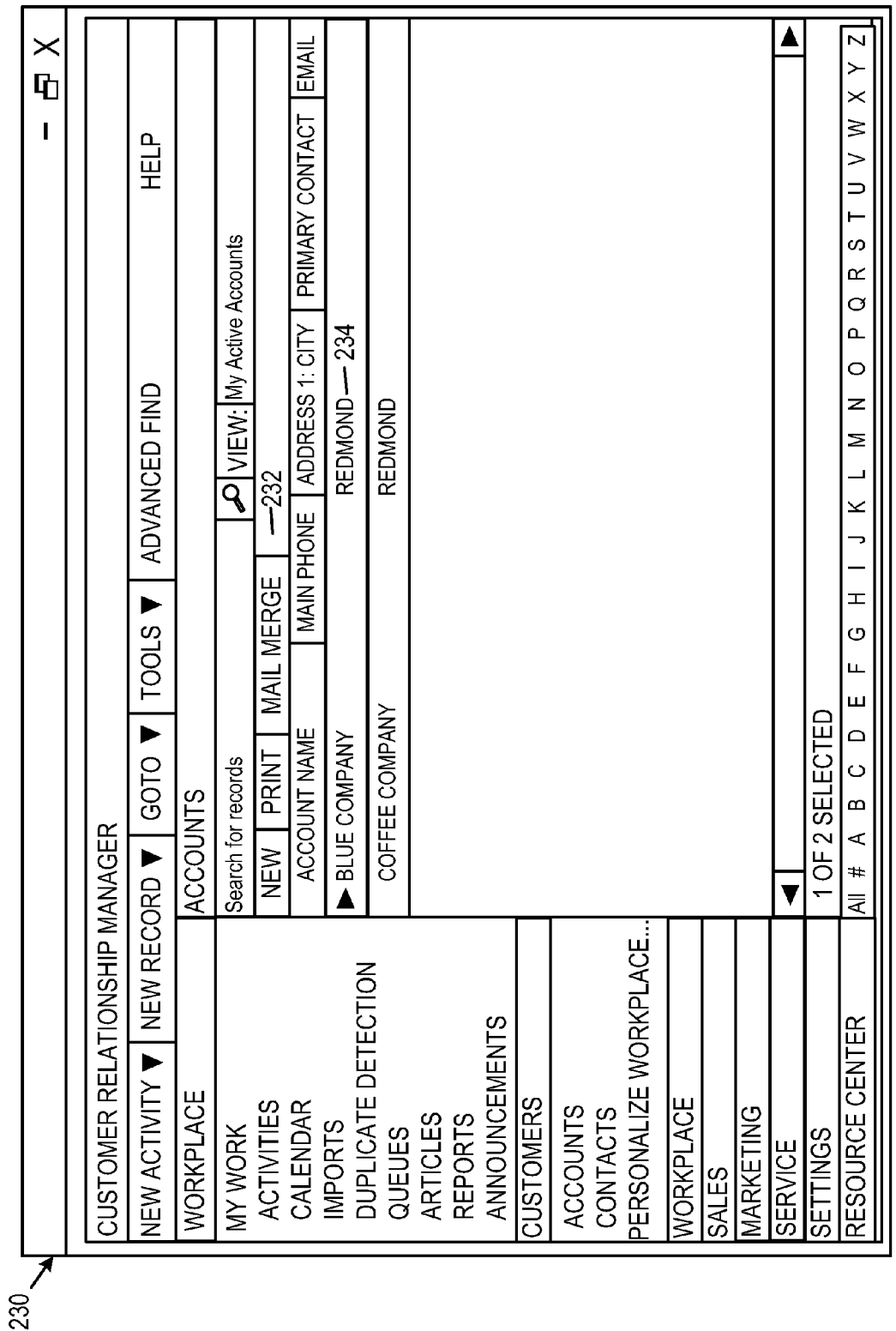
FIG. 3 is a simulated screen for one implementation that illustrates allowing a user to select one or more records to include in a mail merge from within a CRM application.

FIG. 3 is a simulated screen 230 for one implementation that illustrates allowing a user to select one or more records to include in a mail merge from within a CRM application. Upon selecting one or more records 234 from the CRM application, the user can select a mail merge option 232 to invoke the mail merge operation.

Figure 4:
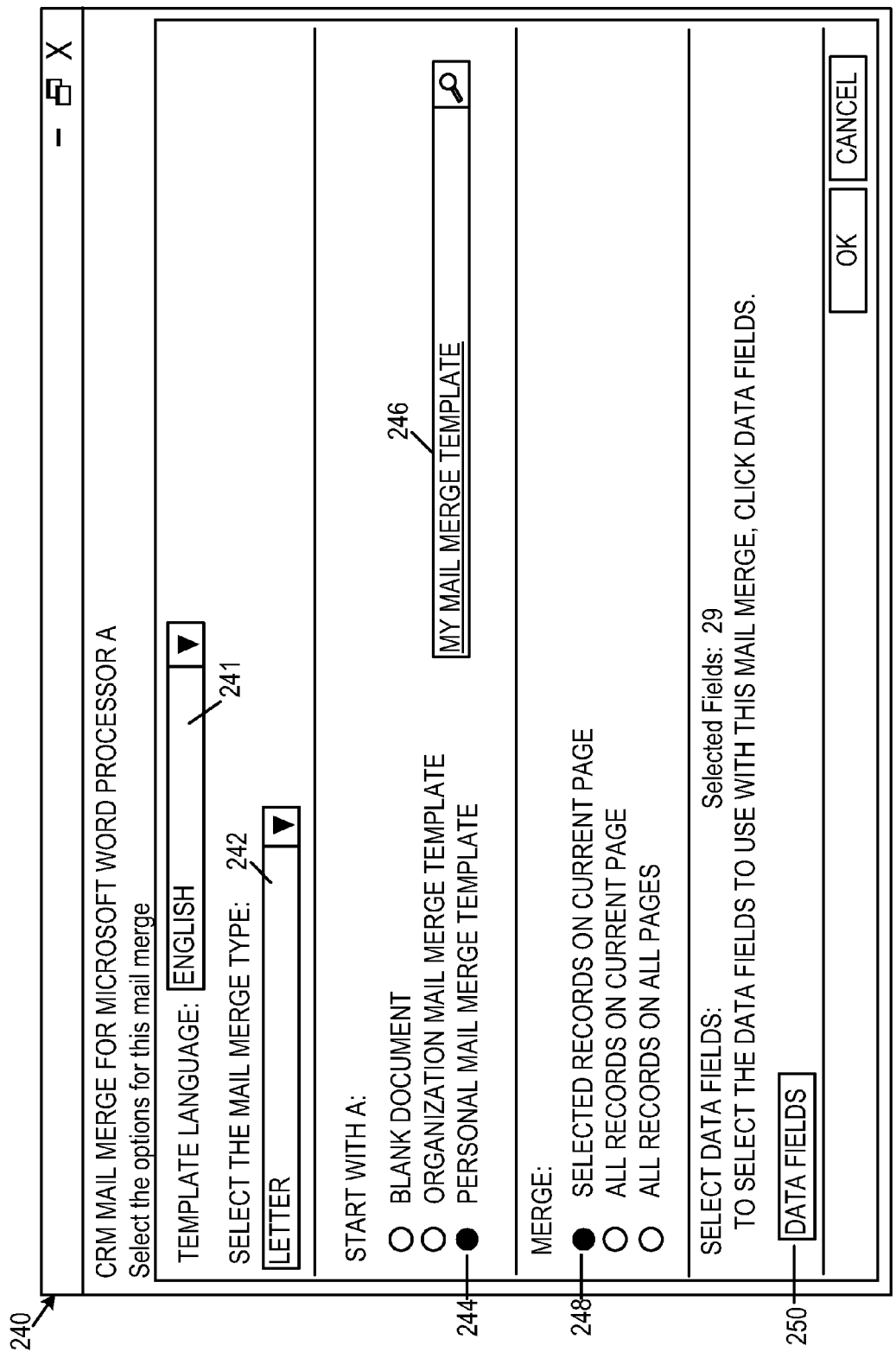
FIG. 4 is a simulated screen for one implementation that illustrates the user selecting mail merge options from within a CRM application.

FIG. 4 is a simulated screen 240 for one implementation that illustrates the user selecting various mail merge options from within a CRM application. These options are just examples, and in other implementations, fewer and/or additional options could also be presented. A template language option 241 is displayed to allow the user to choose the language to be used for the template. In one implementation, template language option 241 is only displayed when the user has multiple languages enabled on his computer (such as through a multi-language pack that is installed on his computer). A mail merge type option 242 is displayed to allow the user to select the type of mail merge being created. A few non-limiting examples of the type of mail merge can include a letter, envelope, brochure, label, email, and so on. A template selection option 244 is also displayed which allows the user to select a blank document or an existing mail merge template to use. The term "mail merge template" as used herein is meant to include a template that contains wording, macros and/or other settings to use as a starting point when creating a new mail merge document. Record merge options 248 are displayed to allow the user to select which records should be merged, such as the selected records on the current page, all records on the current page, or all records on all pages. Data field option 250 is displayed to allow the user to specify which data fields should be included in the mail merge operation.

FIG. 5 is a simulated screen 260 for one implementation that illustrates the user selecting fields to include in the mail merge operation from within a CRM application. In one implementation screen 260 is displayed when the user selects the data field option 250 on FIG. 4. Screen 260 allows the user to select which fields should be included in the mail merge, such as account name 262, account number 264, and city 266. Once the user has specified the various mail merge options (shown in FIGS. 4 and 5), a mail merge document is created according to the user specified settings. The user is then prompted to open the mail merge document or download it for later use. This is illustrated in FIG. 6.

Figure 6:
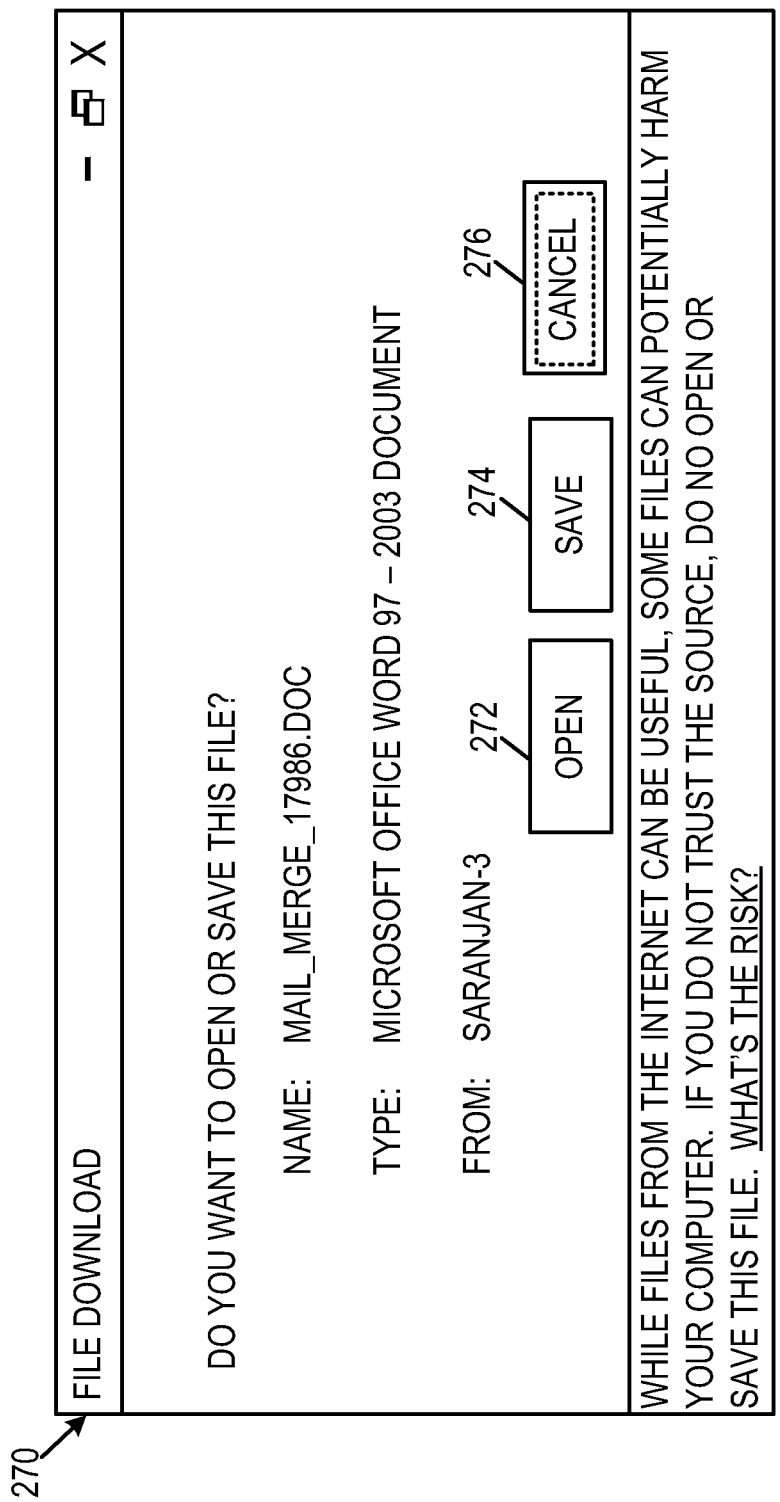
FIG. 6 is a simulated screen for one implementation that illustrates the user being prompted to save or open the mail merge document once it has been created.

FIG. 6 is a simulated screen 270 for one implementation that illustrates the user being prompted to save or open the mail merge document once it has been created. In the example shown, the user can select the open option 272 to open the mail merge document from within the word processor, or the save option 274 to save the mail merge document to a specified location. If the user wishes to cancel the mail merge operation, then cancel option 276 can be selected.

Figure 7:
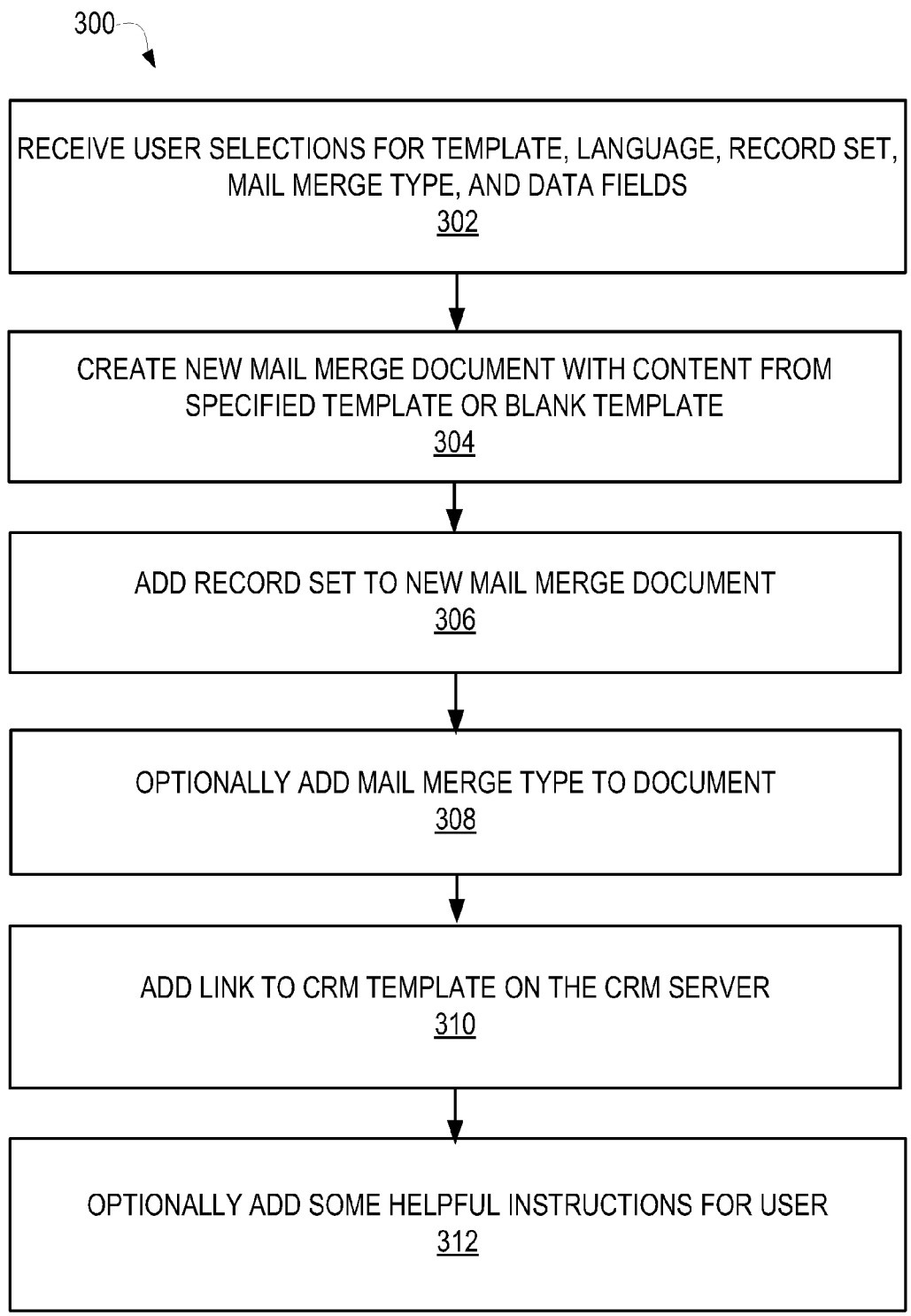
FIG. 7 is a process flow diagram for one implementation illustrating the stages involved in creating a new mail merge document upon receiving settings specified by the user in the CRM application.
Figure 10:
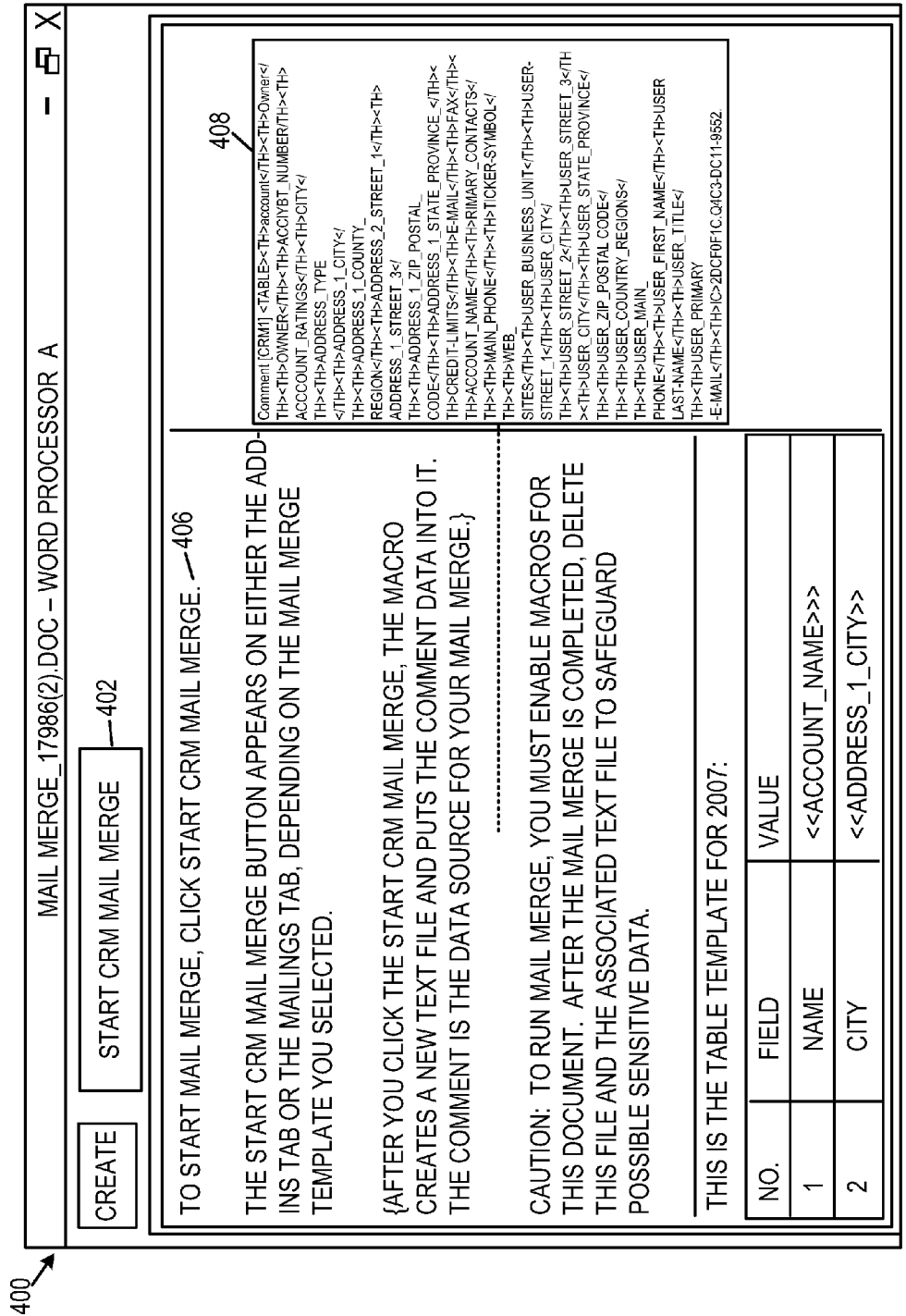
FIG. 10 is a simulated screen for one implementation that illustrates an example of a mail merge document that was created by the CRM application and opened in the client-side word processing application.

Turning now to FIG. 7, a process flow diagram 300 for one implementation is shown that illustrates the stages involved in creating a new mail merge document upon receiving settings specified by the user in the CRM application. Users selections are received for the template, language, record set, mail merge type, and/or data fields (stage 302), as previously described in FIGS. 3-6. A new mail merge document is created that contains content from the specified template or from a blank template (stage 304). In other words, a new document is created that contains the wording from the template that the user specified should be used for the mail merge, if one was specified. The wording could include something like this:

Dear <<First name>>,
I wanted to welcome you to the <<city>>.
Welcome!!
Regards,
Customer Service If no template was specified, then a blank template can be used. The record set that was previously specified by the user is added to the new mail merge document (stage 306), such as in a comment section as shown in FIG. 10. In one implementation, the record set that is used as the data source of the mail merge needs to have two sections, a header and a body section, such as the table illustrates below:

| First name | Last name | City |
|---|---|---|
| John | Doe | Redmond |
| Jane | Doe | Seattle |

When the mail merge is later run, the <<First name>> and <<city>> will get replaced by the records in the record set, which in this example would generate two different customized documents. Note that in one implementation, the column headers also serve as mail merge tags in the document. When a mail merge is later run on the same set of records for the English language, the headers will be in English. If the mail merge is run for the German language, then the headers will be the German equivalent of the first name, last name, and city. The German template will have the tags in German and when the mail merge runs, the information will be displayed in German to the user running the mail merge.

In addition to the record set and the template body, the mail merge type is optionally added to the document (stage 308), if one was previously specified by the user. Data source mappings can optionally be added to map from the data fields in the CRM application to fields in the word processor. A link is added to the CRM template on the CRM server (stage 310). The link to the CRM template on the CRM server is what allows the client-side word processor application to download and invoke the mail merge operation through a signed macro without having to install a plug-in or other application onto the client-side. In another implementation, instead of adding a link to the CRM template on the CRM server, the CRM template is included directly within the mail merge document. Some helpful instructions are optionally added for the user (stage 312), such as those shown in FIG. 10.

Figure 8:
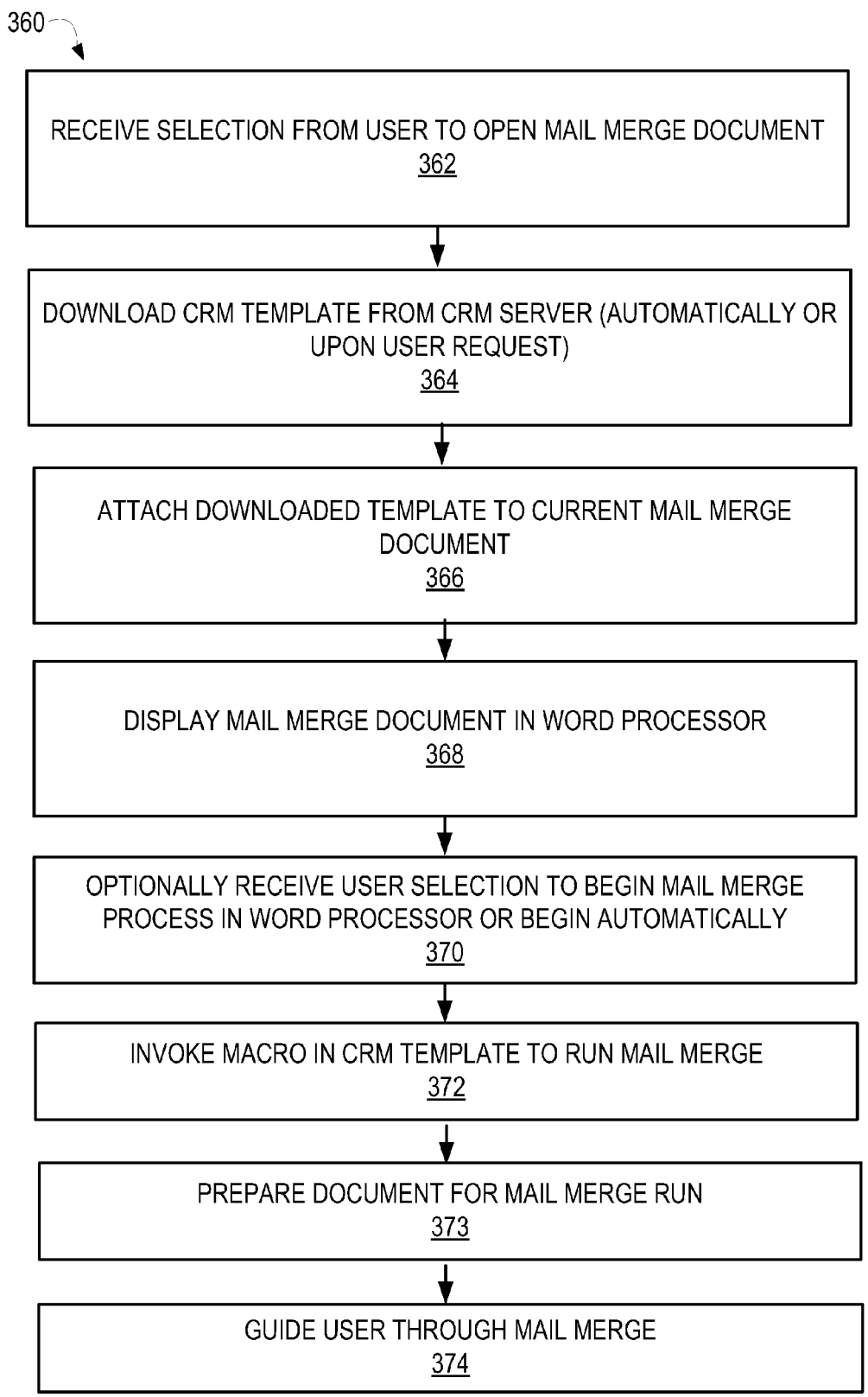
FIG. 8 is a process flow diagram for one implementation illustrating the stages involved in initiating the mail merge operation on the client-side word processing application.

FIG. 8 is a process flow diagram 360 for one implementation illustrating the stages involved in initiating the mail merge operation from the client-side word processing application. A selection is received from the user to open the mail merge document in the word processor (stage 362). This selection can be received from the user by opening the mail merge document directly from the word processor, or by selecting an option to have the web browser open it (272 of FIG. 6). The mail merge document is the one that was previously created according to the processes described in FIGS. 1-7. The CRM template is downloaded from the CRM server automatically upon opening the mail merge document, or upon any user prompt that the word processor may provide for download confirmation (stage 364). The downloaded template is then attached to the current mail merge document (stage 366). The mail merge document is displayed in the word processor (stage 368).

After the template has been attached, a user selection is optionally received to begin the mail merge operation in the word processor, or the mail merge operation begins automatically (stage 370). A macro is invoked in the CRM template to run the mail merge operation (stage 372). The macro prepares the document for the running of the mail merge operation (stage 373), as described in further detail in FIG. 9. The user is guided through the mail merge operation (stage 374).

Figure 9:
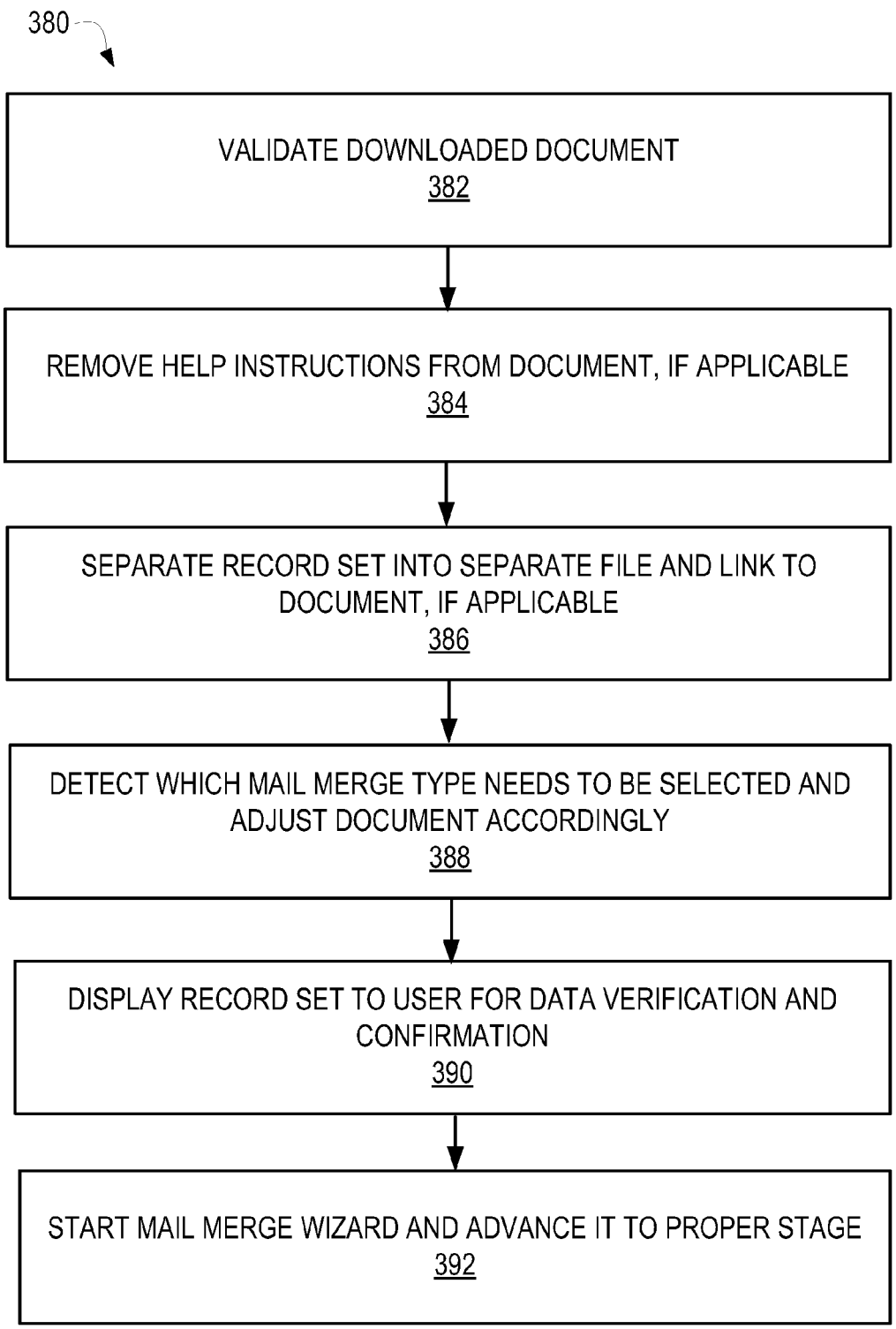
FIG. 9 is a process flow diagram for one implementation illustrating the stages involved in advancing the mail merge operation on the client-side word processing application to where the user can finish the operation.

FIG. 9 is a process flow diagram 380 for one implementation illustrating the stages involved in advancing the mail merge operation on the client-side word processing application to where the user can finish the operation. In one implementation, the process described in FIG. 9 begins when the user selects an option to begin the mail merge operation from within a word processor (after the CRM template has been attached to the mail merge document). The downloaded document that contains the CRM template is validated (stage 382). Help instructions are removed from the document, if applicable (stage 384). The record set is separated into a separate file and linked to the document, if applicable (stage 386). The mail merge type that needs to be selected is detected, and the document is adjusted accordingly (stage 388). For example, if the mail merge type is set to labels or envelopes, then the document size is readjusted to fit the label or envelope specification. In one implementation, if the label or envelope mail merge type is selected, then the word processor's dialog for adjusting the document for label or envelope output is displayed.

The record set is optionally displayed to the user for data verification and confirmation (stage 390). The mail merge wizard is started within the word processor, and the wizard is advanced to the proper stage (stage 392) so the user does not have to specify information that they already specified from within the CRM application previously.

FIG. 10 is a simulated screen 400 for one implementation that illustrates an example of a mail merge document that was created by the CRM application and opened in the client-side word processing application. In the example shown, upon selecting the start CRM mail merge option 402, the CRM macro present in the CRM template that was downloaded from the CRM server is invoked. Helpful instructions 406 are displayed to the user to explain this process. The record set 408 is contained within a comment section within the word processing document. Record set 408 contains the actual data values that will be used by the mail merge operation. Once the mail merge operation has been started upon user selection of the start CRM mail merge option 402, the record set 408 that is contained in the comment section gets extracted into a separate file or other location that can be used as a data source for the mail merge.

Figure 11:
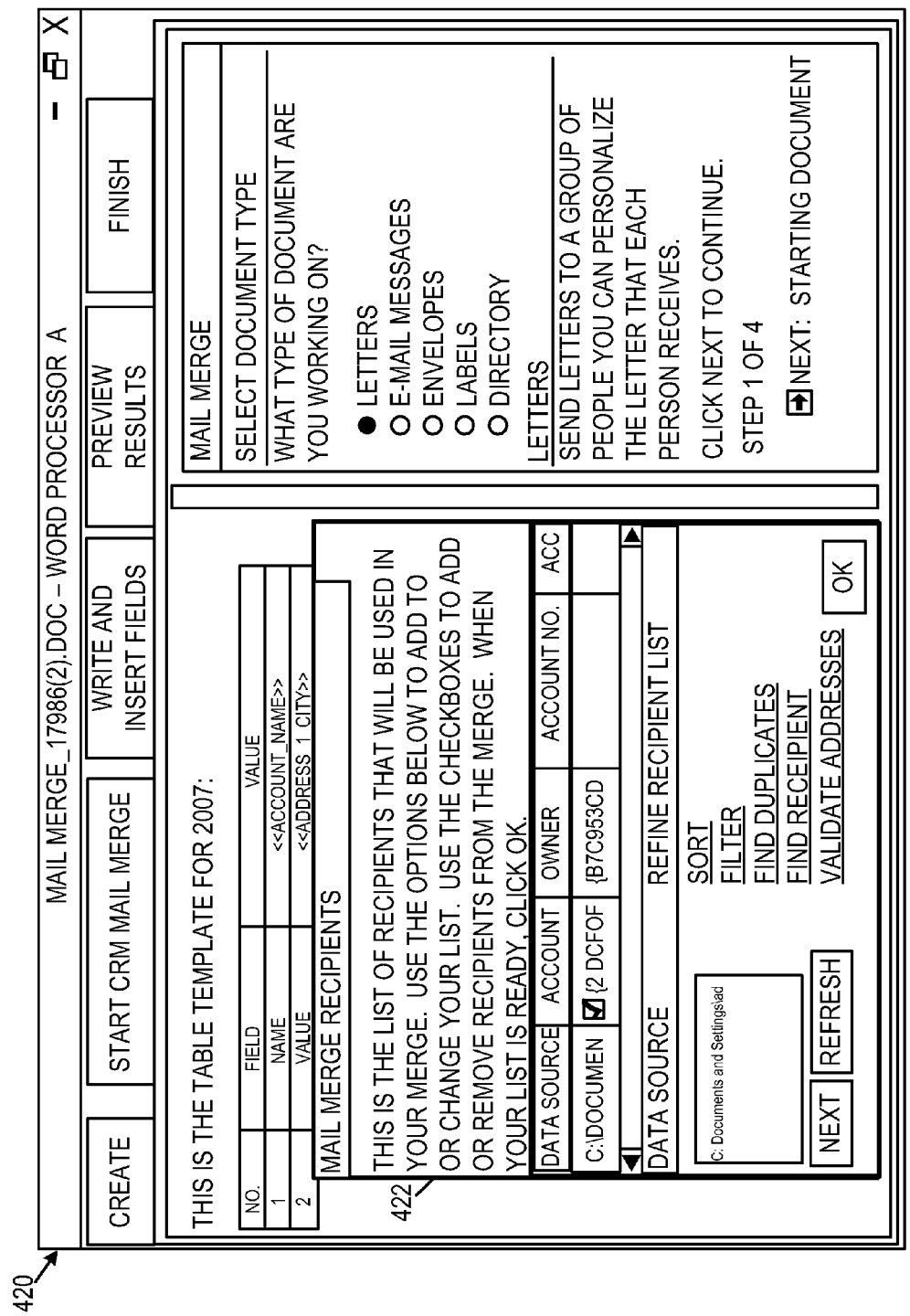
FIG. 11 is a simulated screen for one implementation that illustrates prompting the user to further customize and/or verify the mail merge recipients.

FIG. 11 is a simulated screen 420 for one implementation that illustrates prompting the user with a dialog box 422 to allow the user to further customize and/or verify the mail merge recipients. In one implementation, dialog box 422 is only displayed when the user did not previously specify the desired mail merge recipients from within the CRM application when launching the mail merge operation earlier in this process. In another implementation, dialog box 422 is displayed to allow the user to further customize and/or verify the mail merge recipients.

Figure 12:
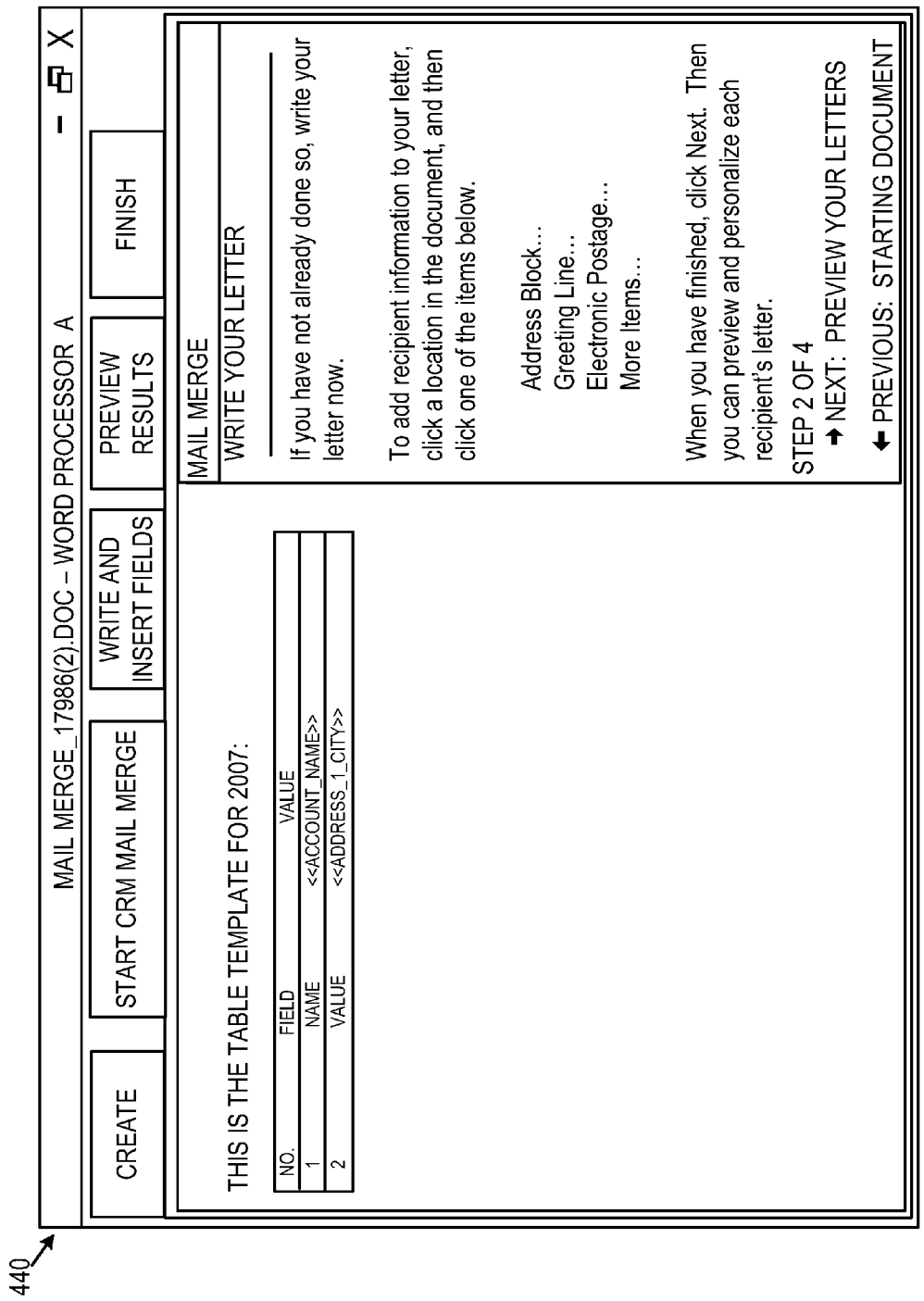
FIG. 12 is a simulated screen for one implementation that illustrates advancing the mail merge operation to a proper stage where the user can then complete the mail merge operation.

FIG. 12 is a simulated screen 440 for one implementation that illustrates advancing the mail merge operation to a proper stage where the user can then complete the mail merge operation. In other words, there may be multiple steps in the typical mail merge operation on the word processor. However, through the settings received from the user previously in the CRM application, this mail merge operation can be advanced to a later stage in the process so the user is not prompted again to specify the same settings a second time.

Figure 13:
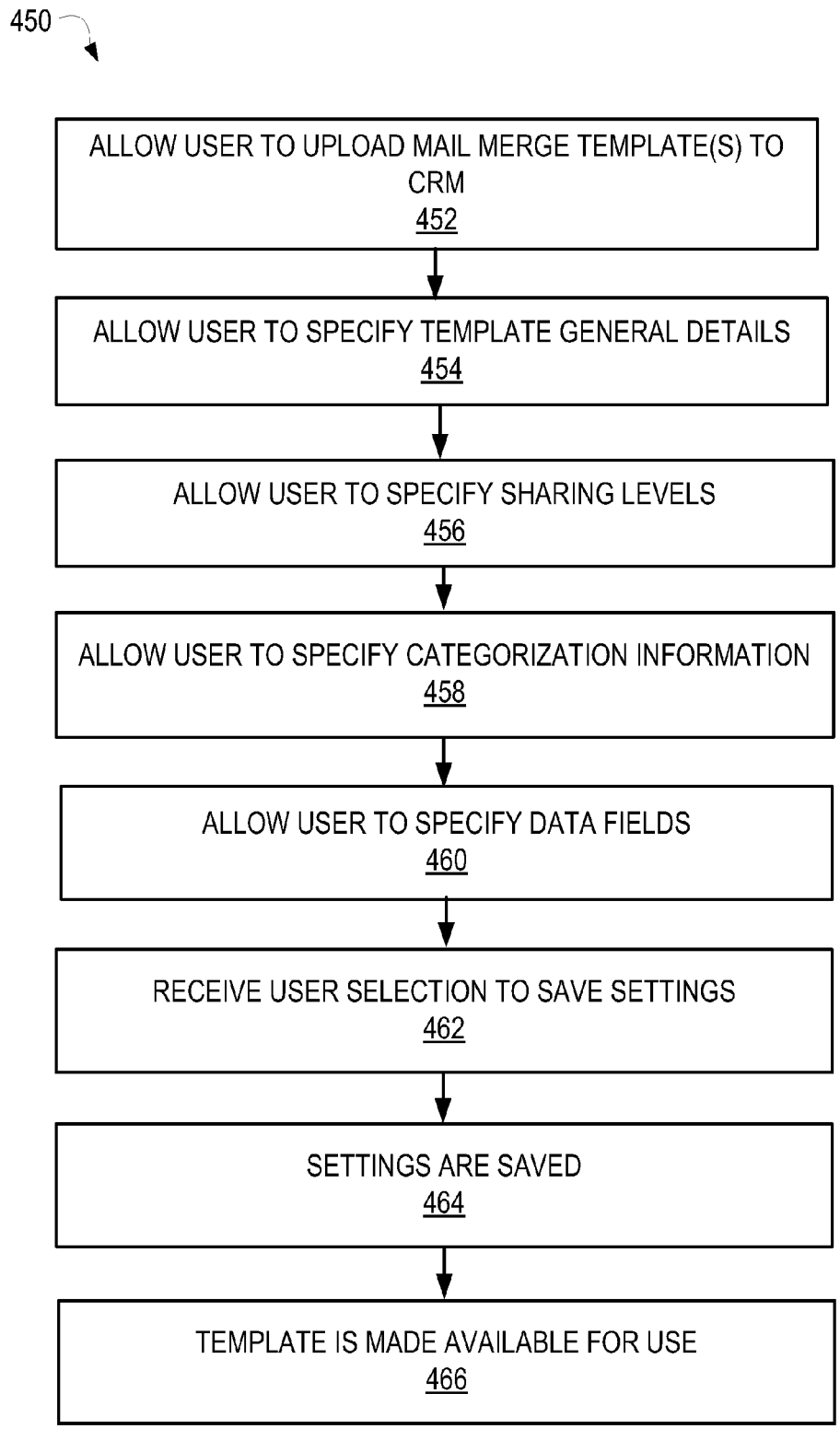
FIG. 13 is a process flow diagram for one implementation illustrating the stages involved in allowing a user to manage mail merge templates on the CRM application.

FIG. 13 is a process flow diagram 450 for one implementation illustrating the stages involved in allowing a user to manage mail merge templates from within the CRM application. The user is able to upload mail merge templates to the CRM application (stage 452), such as mail merge templates that were originally created in a word processor. Various settings can be specified for the mail merge template, including some or all of the settings described in this figure, and/or additional settings. The user is able to specify general details for the template (stage 454). The user is able to specify sharing levels (stage 456). The user is able to specify categorization information (stage 458). The user is able to specify data fields (stage 460). A user selection is received to save these settings (stage 462). These settings are then saved (stage 464) and the template is then made available for use (stage 466). Some exemplary screens will now be illustrated in FIGS. 14-17 to illustrate these customizable settings in further detail FIG. 14 is a simulated screen 470 for one implementation that illustrates allowing a user to manage a mail merge template from within a CRM application. A new template can be created in the word processor program upon selecting the create template in word processor option 472. General details 474 can be specified for a specified mail merge document, such as the template name and description. Categorization information 476 can be specified, such as an associated entity, ownership of the template, owner name, and language of the template. Data fields 478 that should be used in the template can also be specified.

FIG. 15 is a simulated screen 480 for one implementation that illustrates a mail merge template within a CRM application. In the example shown in FIG. 15, data fields have been selected 488, and a file attachment has been specified 490 that contains the template. If the user wishes to edit the template in the word processor, then the edit template in word processor option 482 can be selected. The user can also select the language of the template, and the permissions of the template, such as individual versus organizational.

FIG. 16 is a simulated screen 494 for one implementation that illustrates the customization of a mail merge template to select fields to include from within a CRM application. Screen 494 is displayed when the user selects the data fields 478 button on FIG. 15. In the example shown, the user has selected the account name, account number and address one fields to include in the specified mail merge template. The Record Type field is a drop-down list that contains the associated entity and all entities related to the associated entity. Thus, in one implementation, the user can not only select the fields of the associated entity, but also can select the fields of the linked entity associated with it. In such an implementation, when the user changes the selection on the Record Type, the list of fields displayed changes to represent the fields of that entity.

FIG. 17 is a simulated screen 498 for one implementation that illustrates the assignment of sharing and other security settings for a mail merge template from within a CRM application. In the example shown, various options and actions that can be set for the mail merge template are displayed in an actions list 499, such as delete mail merge template, deactivate mail merge template, make the template available to the organization, assign security permissions to the template, share the template, and so on. For example, a selected template can be made private so that only certain users can access it, or it can be made public so that everyone who can access the system can access it. These are just examples, and other actions could also be used in other implementations.

Figure 18:
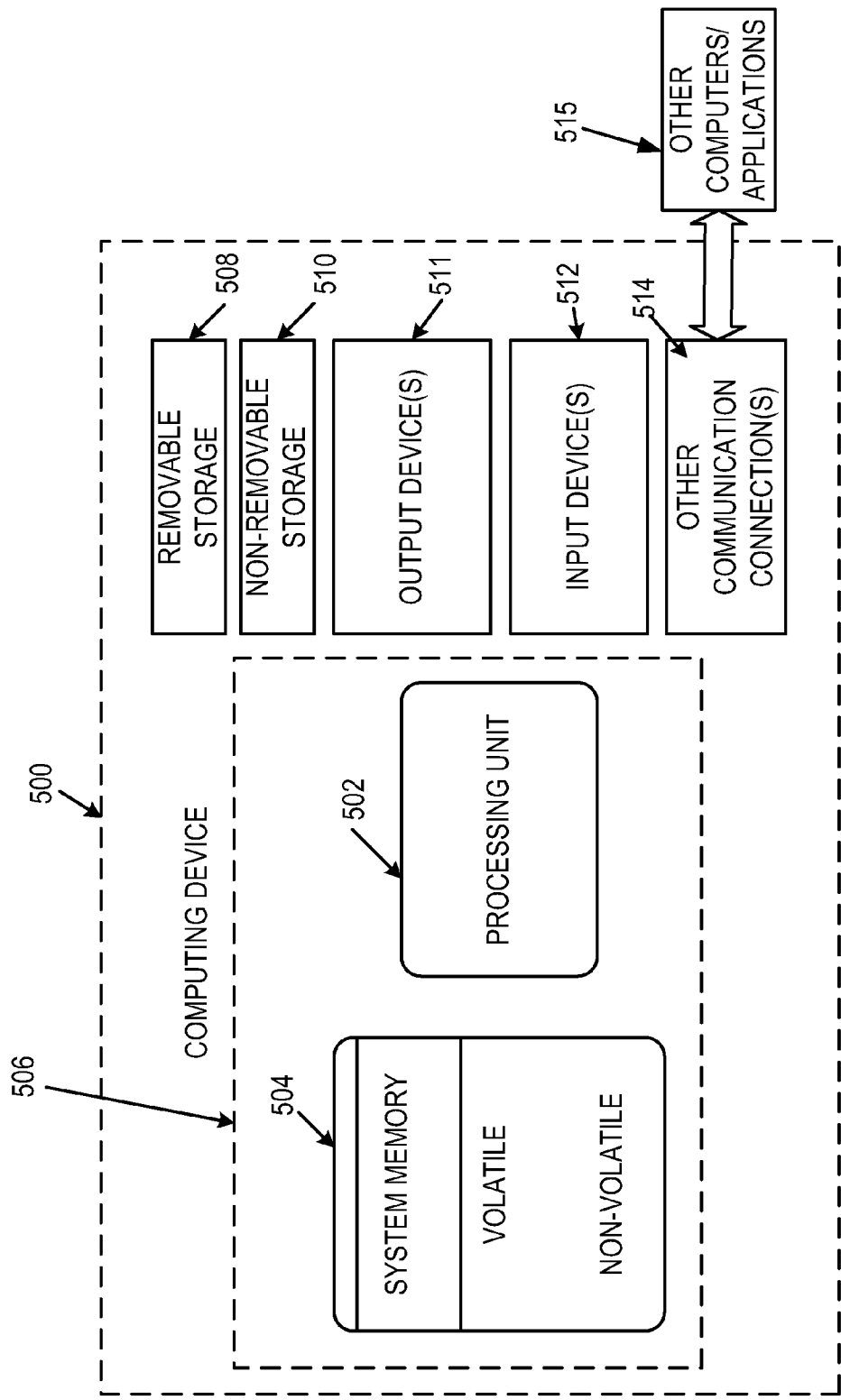
FIG. 18 is a diagrammatic view of a computer system of one implementation.

As shown in FIG. 18, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 18 by dashed line 506.

Additionally, device 500 may also have additional features/ functionality. For example, device 500 may also include additional storage (removable and/or non-removable) including, but not limited to, magnetic or optical disks or tape. Such additional storage is illustrated in FIG. 18 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for generating a mail merge document from a customer relationship management application that can integrate with a mail merge operation on a client-side word processor comprising the steps of:
receiving one or more mail merge settings from a user including a record set to use in a mail merge operation including records to be included, a language selection, a mail merge type including a letter, envelope, label, brochure and email, and a data field selection including an account name, a number, a city, and an address for a template, wherein the user is enabled to select one of a blank document and an existing mail merge template;
downloading the template from the customer relationship management application through one of: an existing authentication of the user and an anonymous authentication;
creating a new mail merge document;
adding helpful instructions to the new mail merge document to explain the mail merge document process, wherein the helpful instructions include instructions for starting a mail merge, enabling macros, and deleting a text file after completion of the mail merge to safeguard sensitive data;
displaying a mail merge document user interface enabling the user to select recipients for the mail merge operation from a list, specify a type of document to be used in the mail merge operation and refine a list of selected recipients by one or more of sorting, filtering, finding duplicates, finding recipients, and validating addresses;
adding the record set to the new mail merge document; and
adding a link to the template that will control the mail merge operation on a client-side word processor, the template being operable to be attached to the new mail merge document and opened on the client-side word processor.

2. The method of claim 1 further comprising the steps of: streaming out the new mail merge document.

3. The method of claim 1, further comprising the steps of: upon receiving a selection from the user to open the mail merge document, launching the client-side word processor and opening the new mail merge document.

4. The method of claim 3, further comprising the steps of: using the link in the new mail merge document to download the template containing a macro that will control the mail merge operation on the client-side word processor.

5. The method of claim 1, wherein the template contains a macro.

6. The method of claim 5, wherein the macro is a signed macro.

7. The method of claim 1, wherein the record set is added to the new mail merge document in a comments section of the new mail merge document.

8. The method of claim 1, wherein the one or more mail merge settings received from the user include a mail merge template to use that contains wording to include in the new mail merge document.

9. A method for beginning a mail merge operation on a client-side word processor comprising the steps of:
validating a downloaded mail merge document that contains settings specified previously by a user, the mail merge document including a record set to use as a data source along with a link to a template that contains a signed macro for controlling a mail merge operation when opened within a client-side word processor, wherein the record set includes actual data values to be used by the mail merge operation;
downloading the template from a customer relationship management application through one of: an existing authentication of the user and an anonymous authentication, wherein the template includes one of: language from a specified template and language from a blank template;
adding at least one data source mapping to the template for mapping data fields of the data source to fields in the client-side word processor;
separating the record set contained in the downloaded mail merge document into one or more separate files;
starting a mail merge wizard and advancing the mail merge wizard to a later stage based upon settings already specified by the user;
allowing the user to specify a sharing level for the template, a categorization information, and one or more data fields associated with the mail merge document, wherein categorization information includes at least one of an associated entity, an ownership of the template, an owner name, and a language of the template;

streaming out the downloaded mail merge document for download; and prompting the user to one of: open and save the downloaded mail merge document and cancel the mail merge operation.

10. The method of claim 9, wherein the mail merge type is determined from the settings specified by the user, and the downloaded mail merge document is adjusted based upon the mail merge type.

11. The method of claim 9, wherein the record set is moved to a separate file and linked to the mail merge document as a data source for the mail merge operation.

12. The method of claim 9, wherein the record set is displayed to the user for data verification.

13. A computer-readable memory device having computer-executable instructions for causing a computer to perform steps comprising:

downloading a mail merge document in response to a selection from a user;

validating the downloaded mail merge document including a customer relationship management application template;

receiving a selection from the user to upload a mail merge template for a word processor to a customer relationship management application, wherein a template selection option allows selection of at least one of a blank document and an existing mail merge template to use;

determining enabled languages within a computer of the user;

adding a template language option into the mail merge template to prompt the user to select one of the enabled languages to be used for the mail merge template, wherein the template language option is displayed when there are more than one enabled languages at the word processor executed on the user's computing device;

prompting the user to specify additional template settings that are used by the customer relationship management application to help integrate a mail merge operation initiated in the customer relationship management application with the word processor including a language selection for the mail merge template, recipients selection for the mail merge operation from a list, a type of document specification to be used in the mail merge operation, and a list of selected recipients refinement by one or more of sorting, filtering, finding duplicates, finding recipients, and validating addresses;

displaying a data field option enabling the user to specify data fields included in the mail merge operation;

allowing the user to specify a sharing level, a categorization information, and one or more data fields associated with the mail merge template;

adding at least one data source mapping to the mail merge template for mapping data fields in the customer relationship management application to fields in the word processor;

storing the mail merge template and additional template settings in the customer relationship management application for later use; and attaching the downloaded mail merge template to the downloaded mail merge document.

14. The computer-readable memory device of claim 13, wherein the additional template settings include sharing levels for the mail merge template.

15. The computer-readable memory device of claim 13, wherein the additional template settings include data fields for the mail merge template.

16. The computer-readable memory device of claim 13, wherein the additional template settings include categorization information for the mail merge template.

17. The computer-readable memory device of claim 13, further having computer executable instructions operable to cause a computer to perform steps comprising:

making the mail merge template available to a plurality of users for use in mail merge operations initiated in the customer relationship management application.

18. The computer-readable memory device of claim 17, wherein the plurality of users who are given access to the mail merge template is controlled by a sharing level that was assigned to the mail merge template.

19. The computer-readable memory device of claim 13, wherein the mail merge template contains wording to include in any new mail merge documents that are created based upon the mail merge template.

\* \* \* \* \*